United States Patent
Travers et al.

(10) Patent No.: US 7,793,022 B2
(45) Date of Patent: Sep. 7, 2010

(54) REPEATER FOR A BIDIRECTIONAL SERIAL BUS

(75) Inventors: James Denis Travers, Rush (IE); Padraig Ryan, Glanmire (IE)

(73) Assignee: RedMere Technology Ltd., Balbriggan, Co. Dublin (IE)

( * ) Notice: Subject to any disclaimer, the term of this patent is extended or adjusted under 35 U.S.C. 154(b) by 27 days.

(21) Appl. No.: 12/219,565

(22) Filed: Jul. 24, 2008

(65) Prior Publication Data

US 2009/0031065 A1    Jan. 29, 2009

Related U.S. Application Data

(60) Provisional application No. 60/935,080, filed on Jul. 25, 2007.

(51) Int. Cl.
G06F 13/00    (2006.01)
G06F 13/36    (2006.01)

(52) U.S. Cl. .................. 710/110; 710/100; 710/300; 710/306; 326/46; 326/63; 326/72; 326/82; 326/86; 327/63; 327/72

(58) Field of Classification Search ................. 370/911; 710/300, 306, 110
See application file for complete search history.

(56) References Cited

U.S. PATENT DOCUMENTS 5,689,196 A * 11/1997 Schutte ................. 326/86
6,362,654 B1 * 3/2002 Anderson et al. ........... 326/82
6,597,197 B1 * 7/2003 Mosley et al. ............. 326/63
6,834,318 B2 * 12/2004 Hunter et al. .............. 710/110
6,842,806 B2 * 1/2005 Ervin ...................... 710/110
7,088,137 B2 * 8/2006 Behrendt et al. ........... 326/46
7,454,535 B2 * 11/2008 Hwang et al. .............. 710/51

OTHER PUBLICATIONS

Philips I2C bus extender, 82B715; 10 pages, dated Mar. 6, 2001.*
VESA E-DDC Standard, Enhanced Display Data Channel Standard Version 1.1, Mar. 24, 2004.
The I2C-Bus Specification, Version 2.1, Jan. 2000, published by the Philips Semiconductors company (document order No. 9398 393 40011.
Part No. PCA9515A from NXP Semiconductors (data sheet available at http://www.nxp.com/acrobat_download/datasheets/PCA9515A_4.pdf—available online prior to Jul. 24, 2007.
Part No. PCA9306 from Texas Instruments (data sheet available at http://focus.ti.com/lit/ds/symlink/pca9306.pdf—available online prior to Jul. 24, 2007.

* cited by examiner

*Primary Examiner*—Mark Rinehart
*Assistant Examiner*—Brian T Misiura
(74) *Attorney, Agent, or Firm*—IP-MEX Inc.

(57) ABSTRACT

A digital bit-level repeater for joining two wired-AND buses such as the $I^2C$ bus is described. A protocol detector is used for tracking clock and data signals to determine the direction of the transfer. A state machine reads and regenerates the clock lines of both buses and provides the clock-stretching protocol feature on both buses. The repeater is designed to pass data bits from one bus to the other transparently when possible, and to latch and hold each data bit until the receiving bus can be clocked when clock-stretching occurs or when the bus is turned around.

20 Claims, 10 Drawing Sheets

REPEATER FOR A BIDIRECTIONAL SERIAL BUS

RELATED APPLICATIONS

The present invention claims benefit from the U.S. provisional application Ser. No. 60/935,080 to Horan. John et al. filed on Jul. 25, 2007 entitled "Circuits and Methods for Gigabit Data Recovery and Digital Repeater Implementation", which is incorporated herein by reference.

FIELD OF THE INVENTION

The invention relates to wired-AND bus protocols, specifically the $I^2C$ and DDC-bus protocol.

BACKGROUND OF THE INVENTION

Open-collector/drain drivers are used on multiple master/ slave devices to control signal lines which are pulled-up externally by a resistor, resulting in a wired-AND bus configuration. This allows for bidirectional communication, arbitration and flow-control between the devices without explicit handshaking. This type of bus configuration is used with such bus protocols as the $I^2PC$ (Inter-IC or Inter Integrated Circuit) and DDC (Display Digital Channel) protocols. The $I^2C$-bus protocol is described in "The $I^2C$-Bus Specification, Version 2.1, January 2000", published by the Philips Semiconductors company (document order number 9398 393 40011). The DDC-bus protocol is defined in the "VESA E-DDC Standard, ENHANCED DISPLAY DATA CHANNEL STANDARD Version 1.1, Mar. 24, 2004". As the DDC standard is based on the $I^2C$ protocol, the latter will be used as the reference herein.

The $I^2C$-bus has two signal lines SCL (Serial Clock) and SDA (Serial Data), which carry serial clock and data information respectively. A number of devices may be connected in parallel to an $I^2C$-bus, but a simple example application of the $I^2C$-bus is the interconnection of two devices through a cable, such as a host device acting as a master and communicating with a remote device that acts as a slave in the protocol sense.

FIG. 1 illustrates a simple $I^2C$-bus system 10 of the prior art. The simple $I^2C$-bus system 10 comprises a Master device 20 and a Slave device 30, both connected to the two Wired-AND signal lines, SCL and SDA which carry serial clock and data information respectively. Each of the signal lines SCL and SDA is accessed in the Master device 20 and the Slave device 30 by PC interface cells 40. The $I^2C$ interface cell 40 includes an $I^2C$ receiver 50 and an $I^2C$ transmitter 60, for interfacing unidirectional logic signals SIN and SOUT to the bus line (SCL or SDA) to which the $I^2C$ interface cell 40 is connected. The signal lines SCL and SDA are further connected to pull-up resistors R1 and R2 respectively which are connected to a positive power source $V_{DD}$.

As shown in the simple $I^2C$-bus system 10 of FIG. 1 the $I^2C$-bus is used to connect only two devices to each other even though the $I^2C$-bus protocol would allow multiple devices to share the bus. The Master device 20 and the Slave device 30 can communicate over the $I^2C$-bus in both directions as described in detail in the above mentioned $I^2C$-Bus Specification.

To permit a longer reach of the $I^2C$-bus, a repeater may be required to regenerate the signals. Implementing a repeater for this type of bus is non-trivial, as the logic state of a Wired-AND signal line (SCL or SDA) does not fully describe the bus state, i.e. the state of the non-local drivers is masked under certain conditions. This is shown in Table 1 which lists the possible conditions that obtain as a function of the state of the remote and local drivers in the master and the slave respectively.

TABLE 1

Interpretation of Wired-AND line values

| Remote Driver | Local Driver | Signal-level (W-AND) | Condition |
|---|---|---|---|
| HIGH | HIGH | HIGH | Line released |
| LOW | HIGH | LOW | Remote driver pulling line low |
| HIGH | LOW | LOW | Local driver pulling line low |
| LOW | LOW | LOW | Both drivers pulling line low |

From the point-of-view of a single end of a Wired-AND signal line, the third and fourth conditions in the table could represent either a case where only the local driver is pulling the line low, or where both are doing so, as the level of the remote driver is not known. Which case is in effect can not be resolved without modifying the value of the local driver, which may undesirably change the value on the line. In this type of bus structure this is a feature, which may be used, for example, to allow a slow slave to hold a clock low until it is ready to receive more data. Where the physical line must be repeated, however, this is a logical problem as in this case the repeater does not know if the data source is pulling the line low and hence can not know whether to pull the repeated line to the data sink low.

FIG. 2 illustrates a repeatered $I^2C$-bus system 61 of the prior art, including an $I^2C$ repeater 70 connected between a master device 20 and a slave device 30. The $I^2C$-bus is consequently split into two segments, a first segment 80 with two signal lines SCL1 and SDA1, and a second segment 90 with two signal lines SCL2 and SDA2. The first segment 80 connects the Master device 20 to the $I^2C$ repeater 70, and the second segment 90 connects the $I^2C$ repeater 70 to the Slave device 30. Each segment includes its own pull-up resistors, that is R1 and R2 in the first segment 80, and R3 and R4 in the second segment 90.

A solution to the logical problem may be found in an analog circuit that uses a third discrete level in addition to HIGH and LOW, and which does not violate the pertinent signaling specification. This solution allows the line to be released to a sub-threshold voltage in order to sense if the remote driver is pulling low. But this solution has the practical problem that a large number of analog design and implementation technology issues must be considered when designing a sense circuit that distinguishes between small threshold values.

Another solution might be to physically propagate the signal lines through the $I^2C$-bus repeater, through appropriate FETs (Field Effect Transistors). This has two significant problems. The first is the requirement to propagate the signal lines through the low-voltage core of the device which leads to a number of analog implementation issues. Secondly, the signal lines can not be boosted, which presents a problem when the purpose of the repeater is to extend the reach of the bus, for example by several meters of cable.

$I^2C$-bus repeaters are commercially available in the form of small packaged specialized analog devices, for example part number PCA9515A from NXP Semiconductors, and part number PCA9306 from Texas Instruments, which have been cited in the Information Disclosure Statement submitted by the applicants. These devices are based on analog circuitry.

Present I²C-bus repeaters are limited to analog circuit techniques, may be subject to noise and other impairments, and require specialized design and manufacturing skills.

Consequently, the development of a digital solution that overcomes these difficulties is very desirable.

SUMMARY OF THE INVENTION

Therefore there is an object of the present invention to provide an improved digital repeater for a bidirectional serial bus, which would avoid or mitigate drawbacks of the prior art.

According to one aspect of the invention, there is provided a digital repeater for repeating bidirectional signals between a host side wired-AND bus connected to a master device, the host side wired-AND bus comprising a host side serial clock line (SCLH) and a host side serial data line (SDAH), and a remote side wired-AND bus connected to a slave device, the remote side wired-AND bus comprising a remote side serial clock line (SCLR) and a remote side serial data line (SDAR), the digital repeater comprising:

an internal repeater logic circuitry;

two host side serial line interface cells for interfacing between the internal repeater logic and the host side serial clock and data lines; and two remote side serial line interface cells for interfacing between the internal repeater logic and the remote side serial clock and data lines.

In the digital repeater of the embodiment of the invention, the wired-AND bus is an I²C bus.

The digital repeater further comprises:

a START/STOP detector for receiving signals from the host side serial clock and data lines and determining start and stop flags indicating START and STOP conditions respectively on the wired-AND bus;

a protocol sequencer for receiving signals from the remote side serial clock and data lines, determining whether the master device on the host side wired-AND bus or the slave device on the remote side wired-AND bus is transmitting, and asserting a "slaveData" flag to indicate that the slave device is transmitting; and a state machine for receiving clock signals arriving on the host and remote side serial clock lines, receiving the start, stop, and "slaveData" flags, and sending clock signals on the host and remote side serial clock lines and determining whether to pass, hold, or force serial data signals on the host and remote side serial data lines, wherein to pass is to pass a signal through the repeater, to hold is to hold a signal at a previous value, and to force is to set a signal on one side of the repeater to a logical zero LO or a logical one HI regardless of the signal on the other side of the repeater.

The digital repeater further includes a data-line controller for passing, holding or forcing the serial data signals under control of the state machine. The data-line controller includes:

a transparent host side latch for passing or holding the SDAH under control of the state machine;

a transparent remote side latch for passing or holding the SDAR under control of the state machine;

a switch allowing the SDAR to float under control of the state machine; and a Field Effect Transistor (FET) for grounding the SDAR under control of the state machine;

In the digital repeater described above, the state machine is always in one of a plurality of N states, and each successor state is reached by a trigger condition derived from signals received by the state machine. In the embodiment of the invention, the state machine has N=18 states.

The N states of the state machine include:

at least one state having a plurality of successor states, a first one of which is triggered when the "slaveData" flag is logical "0" and a second one of which is triggered when the "slaveData" flag is logical "1".

The N states of the state machine also include:

at least one state having successor states, a first one of which is triggered when the start flag is determined and a second one of which is triggered when the stop flag is determined.

Advantageously, the state machine is associated with a timer and includes at least one state for which the trigger is a time out of the timer.

According to another aspect of the invention, there is provided a method for repeating bidirectional signals between a host side wired-AND bus connected to a master device, the host side wired-AND bus comprising a host side serial clock line (SCLH) and a host side serial data line (SDAH), and a remote side wired-AND bus connected to a slave device, the remote side wired-AND bus comprising a remote side serial clock line (SCLR) and a remote side serial data line (SDAR), the method comprising:

receiving each of the bidirectional signals of the host side and remote side wired-AND buses;

extracting in serial line interface cells unidirectional clock and data receive signals from the bidirectional signals of the serial clock and data lines;

processing the unidirectional clock and data receive signals to generate unidirectional clock and data transmit signals; and outputting the unidirectional clock and data transmit signals on the host side and remote side wired-AND buses through the serial line interface cells.

The method further comprises:

determining start and stop flags from the unidirectional clock and data receive signals;

determining from the unidirectional clock and data receive signals whether a master device on the host side wired-AND bus or a slave device on the remote side wired-AND bus is transmitting, and asserting a "slaveData" flag to indicate that the slave device is transmitting;

the step of processing including triggering a state machine with the unidirectional clock receive signals, and the start, stop, and "slaveData" flags; and outputting from the state machine the unidirectional clock transmit signals, according to a state reached in the state machine.

The method further comprises:

outputting one or more control signals from the state machine according to the state reached in the state machine and generating the unidirectional data transmit signals according to the control signal by passing the unidirectional data receive signals through, holding the unidirectional data transmit signals at their previous value, or forcing them, wherein to force is to set them to a logical zero LO or a logical one HI regardless of the value of the unidirectional data receive signals.

The step of outputting control signals includes:

outputting a master data control signal, one value of which to cause the value of SDAR to pass to SDAH, another value to cause the previous value of SDAH to be held.

The step of outputting control signals also comprises:
outputting a slave data control signal,
one value of which to cause the value of SDAH to pass to SDAR,
a second value of which to cause the previous value of SDAR to be held,
a third value of which to cause SDAR to float HI, and
a fourth value of which to set SDAR to LO.

The step triggering includes triggering the state machine from one of a plurality of N states, into a successor state that is a distinct other of the plurality of N states. In the embodiment of the invention, N=18.

The step triggering includes triggering at least one state having a plurality of successor states, a first one of which is triggered when the "slaveData" flag is logical "0" and a second one of which is triggered when the "slaveData" flag is logical "1". The step triggering also includes triggering at least one state having a plurality of successor states, a first one of which is triggered when the start flag is determined and a second one of which is triggered when the stop flag is determined. Conveniently, triggering includes triggering with a timer.

In the embodiment of the invention, the wired-AND bus is an I²C bus.

A communication system, comprising a master device connected to a host side wired-AND bus, and a slave device connected to a remote side wired-AND bus, wherein the host side wired-AND bus is joined to the remote side wired-AND bus by the digital repeater as described above to provide a communication path between the master device and the slave device, is also provided.

BRIEF DESCRIPTION OF THE DRAWINGS

An embodiment of the invention will now be described, by way of example, with reference to the accompanying drawings in which.

DETAILED DESCRIPTION OF THE EMBODIMENTS OF THE INVENTION

To avoid the aforementioned problems inherent in an I²C-bus repeater based on analog circuit techniques, the invention relies on purely digital techniques. This would for example allow the circuit design to be documented in RTL (Register Transfer Language), easily simulated, may be realized in any of many available digital circuit technologies, and conveniently transferred to a device manufacturer using RTL design files.

In the digital domain a full bridge device, which buffers addresses and data may seem viable. There is however a problem with this approach with reference to the I²C-bus specifically. The full bridge would require the repeater to decide whether to acknowledge reception of an address from the master (for example) prior to the repeater knowing whether that address would be acknowledged on the slave side. If it does transmit an ACK back to the master and that address is subsequently not acknowledged on the repeated side, the master may go into an inappropriate state; if the ACK is not sent to the master, and should have been, the master could in principle attempt to re-transmit the associated payload but there is no guarantee the master will make the attempt.

The embodiment of the present patent application describes a technique to implement a purely digital solution without the complication and design overhead of a fully buffered bridge. The functionality relies on bit-level clock-stretching. This is a feature of the I²C specification, as well as other Wired-AND buses, which allows connected devices to hold the clock line low in order to satisfy possible frequency limitations during arbitration. The innovative concept derives from the idea of extending the bit-level clock-stretching to bit-level manipulation, including deferring data transfers across the repeater as needed.

Before entering the description of the digital I²C-bus repeater of the invention, the method of clock-stretching according to the I²C specification is described.

Figure 3:
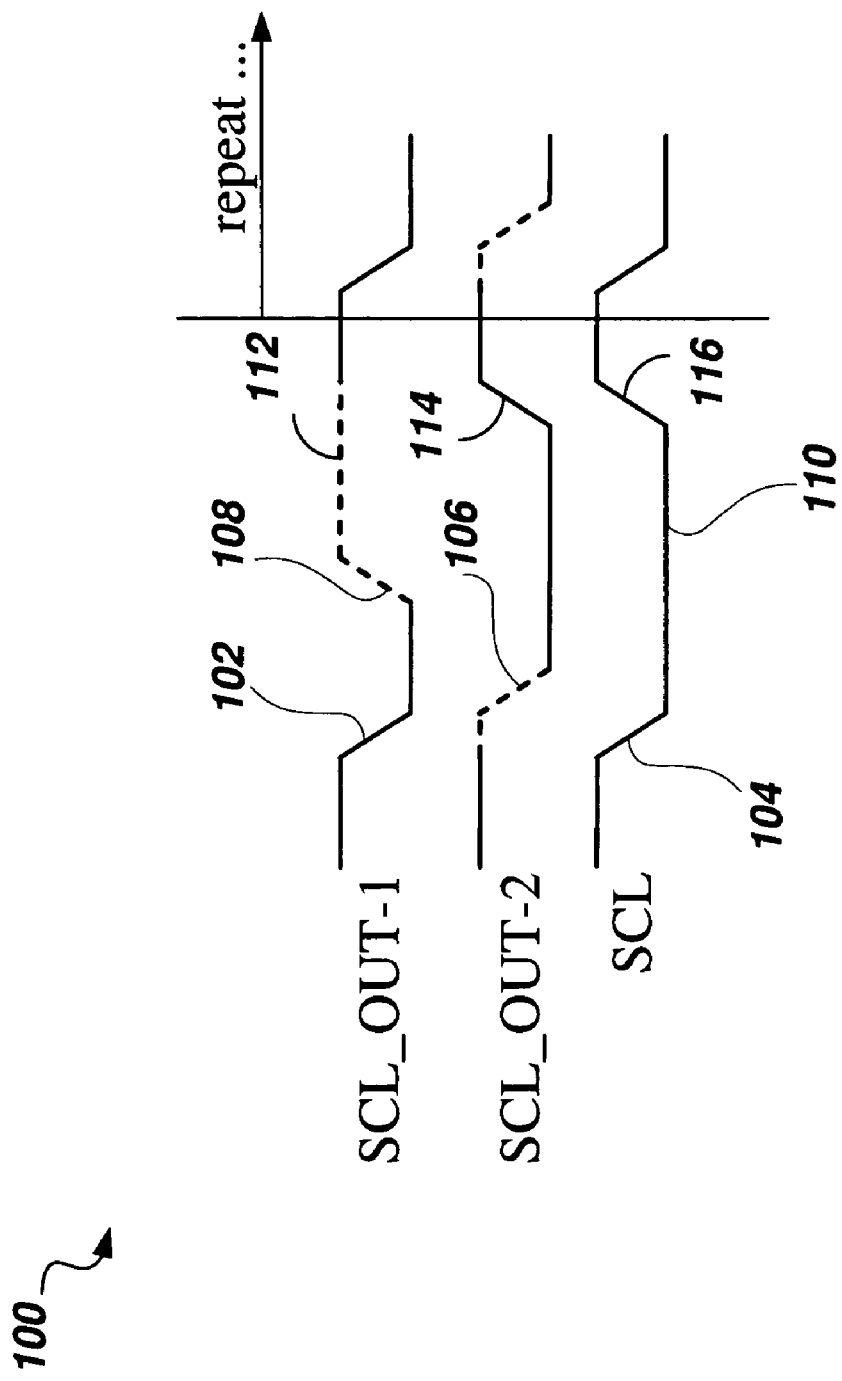
FIG. 3 shows a timing diagram 100 illustrating clock-stretching.

FIG. 3 shows a timing diagram 100 illustrating clock-stretching. The timing diagram 100 shows three representative waveforms: SCL_OUT-1 representing the driver output of the clock line of a fast device; SCL_OUT-2 representing the driver output of the clock line of a slower device; and SCL representing the actual signal that appears on the SCL clock line of an I²C-bus. The SCL signal represents the actual logic value on the line after the Wired-AND function—this is also the value read by the input buffer of all devices. Where either of the output buffer values differ from the resolved SCL value, this is represented by a dotted line.

The sequence in the timing diagram 100 of FIG. 3 is as follows.
102: SCL_OUT-1 goes low as the fast device initiates a bit transfer by pulling down the clock line;
104: SCL goes low because any driver applying a logic-zero to the bus will cause the low to be reflected on the line;
106: SCL_OUT-2 goes low as the slower device sees SCL go low and also wants to arbitrate for bus ownership so it also pulls its driver low.

At this point both drivers are counting their desired minimum low pulse-width, typically with a timer.
108: SCL_OUT-1 goes high as the fast device times-out first and releases its output driver;
110: SCL will stay low until the slow device is released;
112: SCL_OUT-1 stays high as the fast device now has to enter a wait-state until it sees SCL go high through its input buffer;
114: SCL_OUT-2 goes high as the slow device times-out and releases its output driver;
116: SCL goes high because both SCL_OUT-1 and SCL_OUT-2 are high.

The sequence may then repeat. Through this method the slowest device on the bus may keep pace with the transmission by limiting the bus frequency.

The Wired-AND function is also used on the data line, SDA, but for a different reason. The arbitration process requires a method of delegating bus ownership when there are more than two devices on the bus, for example a master-A, a master-B, and a slave. If the two masters begin addressing the slave with one or more address or data bytes simultaneously (see the I²C specification for details on addressing), the Wired-AND function will ensure that the transmission is good as long as the transmitted bits do not differ. But as soon as the master-A transmits a low value and the master-B attempts to transmit a high value for example, the master-B will see that his value has not been transferred to the data line since the zero (LOW) will prevail. This is the signal that the master-B has lost the arbitration and must back off the bus until a later time. Note that the master-A's transmission has not been corrupted by the arbitration process.

In the digital I²C-bus repeater of the present invention it is proposed to exploit the clock-stretching function that is available in the I²C protocol, and generalize it.

Figure 1:
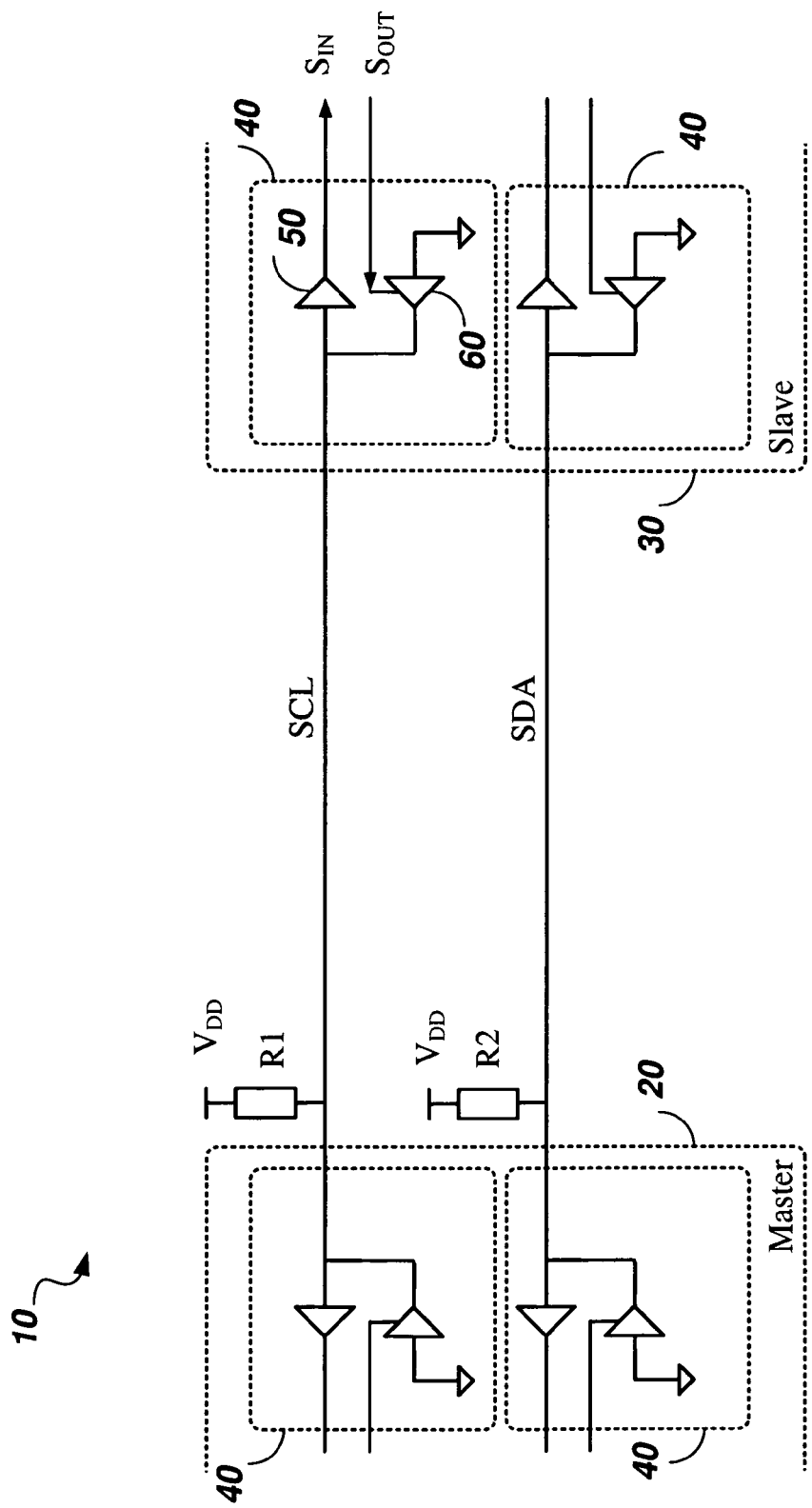
FIG. 1 illustrates a simple I²C-bus system 10 of the prior art.
Figure 2:
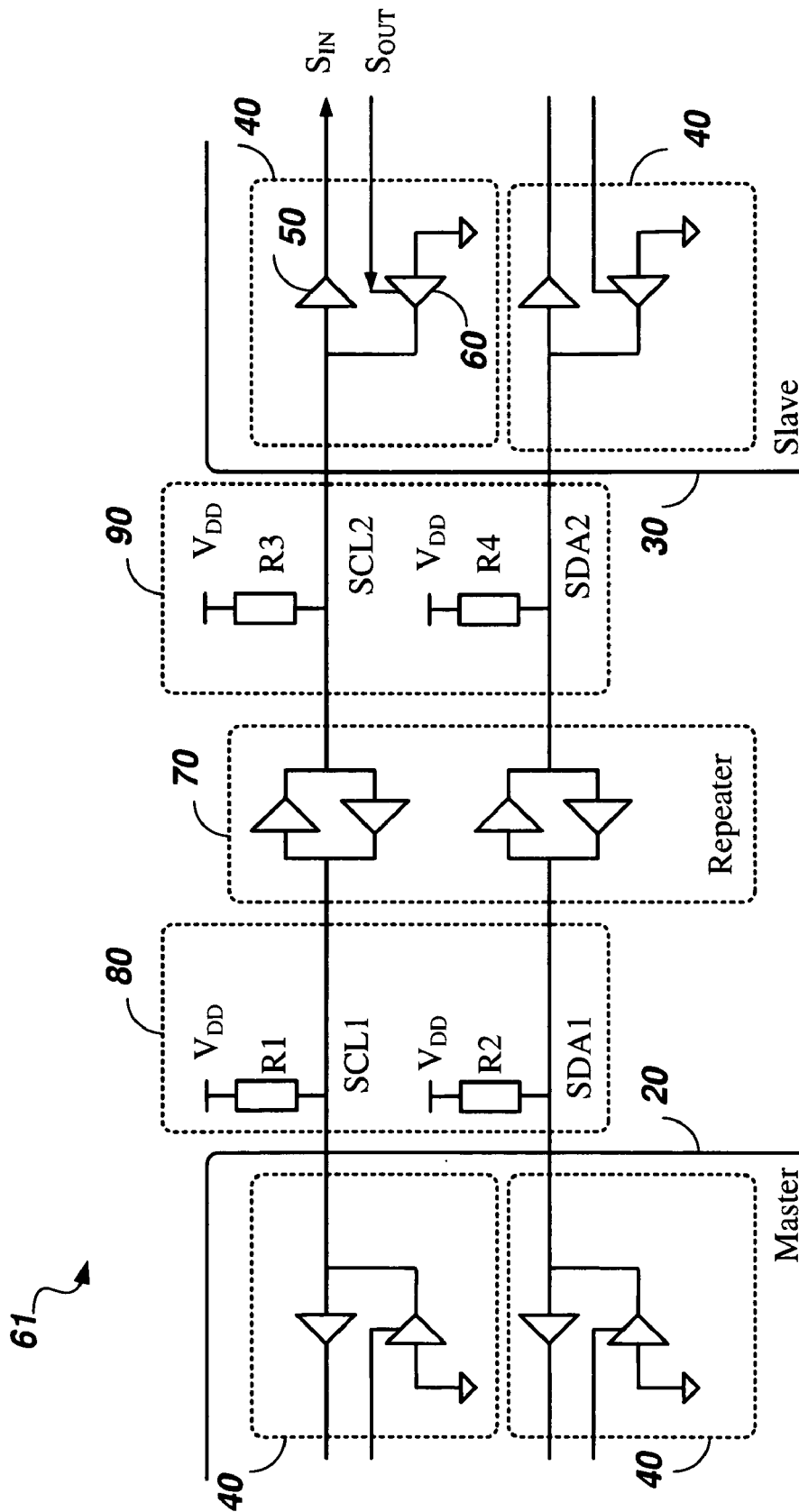
FIG. 2 illustrates a repeatered I²C-bus system 61 of the prior art.
Figure 4:
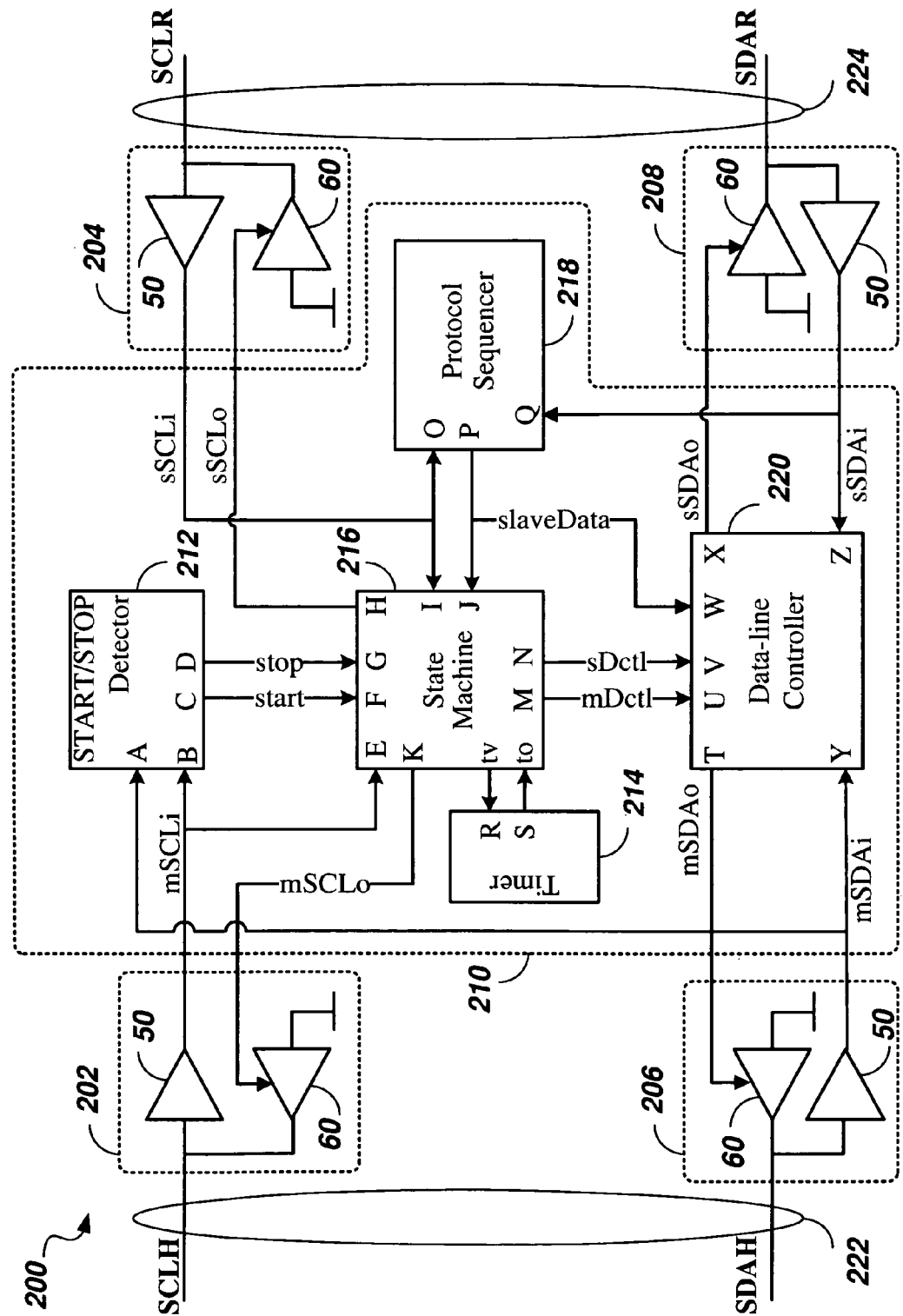
FIG. 4 shows a block diagram of a digital I²C-bus repeater 200.

FIG. 4 shows a block diagram of a digital I²C-bus repeater 200 including two host side serial line interface cells 202 and 206, two remote side serial line interface cells 204, 208, and an internal repeater logic circuitry 210. The four serial line interface cells 202 to 208 may conveniently be identical to the conventional I²C interface cells 40 described above (FIG. 2), each including an I²C receiver 50 and an I²C transmitter 60. The internal repeater logic circuitry 210 includes the following functional blocks: a START/STOP Detector 212 having inputs "A" and "B" and outputs "C" and "D"; a Timer 214 having an input "R" and an output "S"; a State Machine 216 having inputs "E", "F", "G", "I", "J", and "to", and outputs "H", "K", "M", "N", and "tv"; a Protocol Sequencer 218 having inputs "O" and "Q", and an output "P"; and a Data-line Controller 220 having inputs "U", "V", "W", "Y", and "Z", and outputs "T" and "X".

The serial line interface cells 202, 204, 206, 208 connect to external bidirectional I²C-bus signal lines SCLH (Host side Serial Clock Line), SCLR (Remote side Serial Clock Line), SDAH (Host side Serial Data Line), and SDAR (Remote side Serial Data Line) respectively, and to internal unidirectional signal lines as follows:

the receiver (50) of the serial line interface cell 202 drives a master clock input signal mSCLi connected to the input "B" of the START/STOP Detector 212 and the input "E" of the State Machine 216;

a master clock output signal mSCLo from the output "K" of the State Machine 216 drives the transmitter (60) of the serial line interface cell 202;

the receiver (50) of the serial line interface cell 204, drives a slave clock input signal sSCLi connected to the input "I" of the State Machine 216 and the input "O" of the Protocol Sequencer 218;

a slave clock output signal sSCLo from the output "H" of the State Machine 216 drives the transmitter (60) of the serial line interface cell 204;

the receiver (50) of the serial line interface cell 206, drives a master data input signal mSDAi connected to the input "Y" of the Data-line Controller 220, as well as the input "A" of the START/STOP Detector 212.

a master data output signal mSDAo from the output "T" of the Data-line Controller 220 drives the transmitter (60) of the serial line interface cell 206;

the receiver (50) of the serial line interface cell 208, drives a slave data input signal sSDAi connected to the input "Z" of the Data-line Controller 220, as well as to the input "Q" of the Protocol Sequencer 218; and a slave data output signal sSDAo from the output "X" of the Data-line Controller 220 drives the transmitter (60) of the serial line interface cell 208.

To facilitate reading the description, these signal names were constructed by adding prefix and suffix letters to the standard I²C-bus signal names SCL and SDA as follows: the suffix letter "H" refers to a host side I²C-bus 222 comprising SCLH and SDAH, that is the I²C-bus on the Host side of the repeater; the suffix letter "R" refers to a remote side I²C-bus 224 comprising SCLR and SDAR, that is the I²C-bus on the Remote side of the repeater; the prefix letter "m" marks the unidirectional signal lines within the repeater on the master side, the suffix letters "i" and "o" indicating the input and output directions respectively from the point of view of the internal repeater logic 210, for example mSCLi; and similarly, the prefix letter "s" marks the unidirectional signal lines within the repeater on the slave side. It is assumed that the host device is the master of the host side I²C-bus 222 while the remote device on the remote side I²C-bus 224 is the slave, as is the case when the digital I²C-bus repeater 200 is used in an HDMI application for example. It is generally possible to have one or more I²C-masters on the host side (SDAH and SCLH) of the digital I²C-bus repeater 200 while I²C-slaves must be connected on the remote side (SDAR and SCLR).

Other connections between the function blocks of the internal repeater logic 210 bear functionally descriptive signal names and include:

a "start" flag from the output "C" of the START/STOP Detector 212 to the input "F" of the State Machine 216;

a "stop" flag from the output "D" of the START/STOP Detector 212 to the input "G" of the State Machine 216;

a "timerValue" signal is connected from the "tv" output of the State Machine 216 to the input "R" of the Timer 214;

a "timeOut" signal is connected from the output "S" of the Timer 214 to the input "to" of the State Machine 216;

a "slaveData" signal from the output "P" of the Protocol Sequencer 218 to the input "J" of the State Machine 216 and to the input "W" of the Data-line Controller 220;

a "masterDataControl" (mDctl) signal from the output "M" of the State Machine 216 to the input "U" of the Data-line Controller 220; and a "slaveDataControl" (sDctl) signal from the output "N" of the State Machine 216 to the input "V" of the Data-line Controller 220.

The function of each of the serial line interface cells 202, 204, 206, 208 is to extract from each of the bidirectional signals on the host side and remote side I²C-buses unidirectional clock and data receive signals that are input into the internal logic 210, and to accept unidirectional clock and data transmit signals from the internal logic 210 for outputting on the host side and remote side I²C-buses. The unidirectional clock receive signals are mSCLi and sSCLi, the unidirectional data receive signals are mSDAi and sSDAi, the unidirectional clock transmit signals are mSCLo and sSCLo, and the unidirectional data transmit signals are mSDAo and sSDAo.

The START/STOP Detector 212 is used to detect START and STOP conditions on the I²C-bus as specified in the I²C-bus specification and flag these conditions as the "start" and "stop" flags to the State Machine 216 respectively.

The Timer 214 is provided to ensure that I²C timing is preserved for all slave-side transmissions according to the I²C specification. The values which the timer can count are shown in Table 2. Note that the implemented individual values are higher than minimum values specified in the I²C specification, such that the combined period is the required 10 μs.

TABLE 2

Timer values

| Name | I2C Specification | Value @ 100 kHz | Description |
|---|---|---|---|
| HI | $t_{HIGH}$ | 4.444 µs | Minimum high phase of SCL |
| LO | $t_{LOW}$ | 5.222 µs | Minimum low phase of SCL |
| HOLD | $t_{SU;DAT}$ | 0.334 µs | Minimum hold time between SCL low and SDA update |

The Protocol Sequencer 218 serves to determine whether the master or the slave is transmitting the next bit. The logic in this block follows the I²C protocol to detect the location of read/write (R/W) bits and their corresponding ACKs in the bit streams. By default the master is writing and the "slaveData" signal (the output "P" from the Protocol Sequencer 218) is low. If the master is reading data from the slave, it will first transmit an address comprising 7 bits, followed by the read/write (R/W) bit set to "read", that is the 8th bit of the transmitted byte is set to "1" according to the I²C protocol.

If a "read" bit is seen (at the input "Q") at the end of the transmitted address by counting clock pulses on the sSCLi signal at the input "O", and this is subsequently acknowledged (ACKed) by the slave, the "slaveData" signal is asserted at the output "P" to indicate that the following data word initiates from the slave. The Protocol Sequencer 218 also identifies the ACKs themselves as coming from the opposite end to the data transmission.

In the preferred embodiment of the invention, the convention that 7-address bits are followed by the R/W bit, and the ACK, is assumed. Different conventions may also be used on I²C-buses, and the internal logic of the Protocol Sequencer 218 could easily be adjusted to accommodate these.

The Data-line Controller 220 controls the transfer of data bits from one bus to the other. Normally data on the transmitting SDA bus (SDAH) should be conveyed to the receiving SDA bus (SDAR) through the repeater. There are some exceptions to this, prompting the need for the data-line controller. In a case where, for example, the master is transmitting a bit and the slave is stretching its clock, the master may complete the clock pulse on SCLH and modify its data on SDAH for the subsequent bit before the slave side eventually clocks. If SDAH were simply repeated to SDAR on the slave side bus, this would mean that the data is incorrect on SDAR when the slave side eventually clocks (SCLR). The solution to this is for the state-machine to force this block to hold the data value received on SDAH and continue to send it on SDAR until the bit sequence has completed. The same hold requirement is true of slave-transmitted bits on SDAR destined for SDAH. An extra requirement of the SDAR line is that the state-machine must be able to pull the line low and release it independently of the SDAH value; this is necessary in the case of the START/STOP sequences. Another requirement for the Data-line Controller arises if the State Machine 216 allows data to be passed in both directions simultaneously, creating a positive feed-back loop which could lock up.

Figure 5:
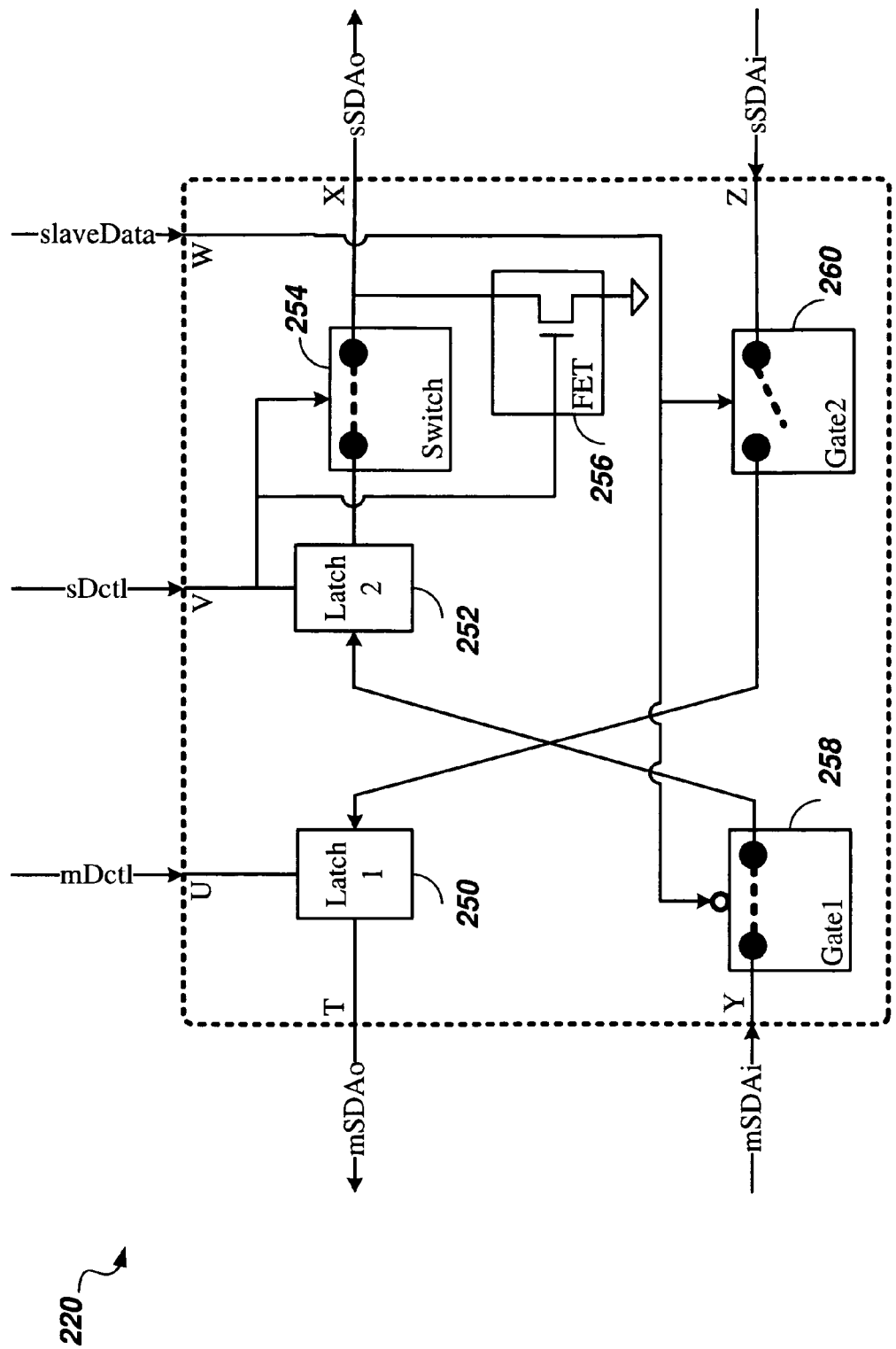
FIG. 5 shows an expanded block diagram of the Data-line Controller 220 of the digital I²C-bus repeater 200.

FIG. 5 shows an expanded block diagram of the Data-line Controller 220 of the digital I²C-bus repeater 200 of FIG. 4, including a transparent host side latch1 250; a transparent remote side latch2 252; a Switch 254; a FET (field effect transistor) 256, and two gates, host side Gate1 258 and remote side Gate2 260.

The transparent host side latch1 250 receives the sSDAi signal from the input "Z" via the remote side Gate2 260, and outputs the mSDAo signal through the output "T". The transparent remote side latch2 252 receives the mSDAi signal from the input "Y" via the host side Gate1 258, and outputs the sSDAo signal via the Switch 254 through the output "X". In this way a pair of cross-coupled data paths is established that link the SDAH bus to the SDAR bus (FIG. 4).

The sSDAo signal is also connected to the drain of the FET 256 whose source is connected to ground and whose base is controlled by the "slaveDataControl" (sDctl) signal.

The Transparent Latches 250 and 252 are controlled by the "masterDataControl" (mDctl) and "slaveDataControl" (sDctl) signals respectively (inputs "U" and "V").

The "masterDataControl" (mDctl) signal has two possible states: "PASS" and "HOLD". When mDctl="PASS", the transparent host side latch1 250 behaves transparently, that is its output follows its input. When mDctl="HOLD", the transparent host side latch1 250 no longer follows the input, but latches and outputs the last value. The "slaveDataControl" (mDctl) signal has four possible states: "PASS", "HOLD", "0", and "1". When mDctl="PASS", the transparent remote side latch2 252 behaves transparently, that is its output follows its input, and the Switch 254 is closed, propagating the output of the transparent remote side latch2 252 to the sSDAo signal at the output "X". When mDctl="HOLD", the transparent remote side latch2 252 no longer follows the input, but latches and outputs the last value which is propagated to the sSDAo at the output "X". When mDctl="0", the output of the transparent remote side latch2 252 is disconnected by the Switch 254 which is turned off, the FET 256 is turned on, and the output "X" is thus grounded, sending a "0" (LO) on the sSDAo signal. When mDctl="1", the output of the transparent remote side latch2 252 is similarly disconnected by the Switch 254 which is turned off, the FET 256 is turned off, and the output "X" is thus left floating to a "1" (HI) on the sSDAo signal by virtue of a pull-up resistor (not shown) or other means.

Although the Data-line Controller 220 acts directly only on the outputs of the unidirectional signals mSDAo and sSDAo, when the mDctl or the sDctl control signal has the value "PASS", the Data-line Controller 220 in effect allows the corresponding data to cross the repeater transparently from the bidirectional signal SDAR to SDAH and from SDAH to SDAR direction respectively.

Similarly when the mDctl or the sDctl control signal has the value "HOLD", the previous value of SDAH or SDAR respectively is held. And when the sDctl control signal has the value "0" or "1", the SDAR output is forced LO and left floating respectively.

The gates 258 and 260 are controlled by the "slaveData" signal. When the "slaveData" signal is low (logical "0"), the host side Gate1 258 is closed and the remote side Gate2 260 is open, as indicated in FIG. 5, thus allowing data from the SDAH bus (mSDAi) to pass through to the SDAR bus (sSDAo) subject to the Switch 254 being closed, while blocking data from the SDAR bus (sSDAi) from reaching the SDAH bus (mSDAo). Conversely, when the "slaveData" signal is high (logical "1"), the host side Gate1 258 is open and the remote side Gate2 260 is closed, thus allowing data from the SDAR bus (sSDAi) to pass through to the SDAH bus (mSDAo), while blocking data from the SDAH bus (mSDAi) from reaching the SDAR bus (sSDAo). This mutual exclusion of the two data paths is necessary to prevent the circuit from locking up when both latches 250 and 252 are in the transparent state, i.e. both mDctl and sDctl are set to "PASS".

Thus the data path (SDAH to/from SDAR) through the I²C-bus repeater 200 is generally open in the direction from the master to the slave but reverses when data are expected to travel from the slave to the master, or other conditions intervene as dictated by the State Machine 216. By contrast, there is never a direct transparent clock path (SCLH to/from SCLR). The clock signals outgoing from the repeater in both directions are always generated by the State Machine 216 directly.

The block diagram of the Data-line Controller 220 of FIG. 5 is shown as a means of explaining its functionality; actual implementation of this block may vary and will depend on the digital technology being used for which the design is intended.

The State Machine 216 controls the main bit-level control of the I²C-bus repeater 200. It is described by its state-diagram which is shown in FIG. 6 following and Table 3 below.

Figure 6:
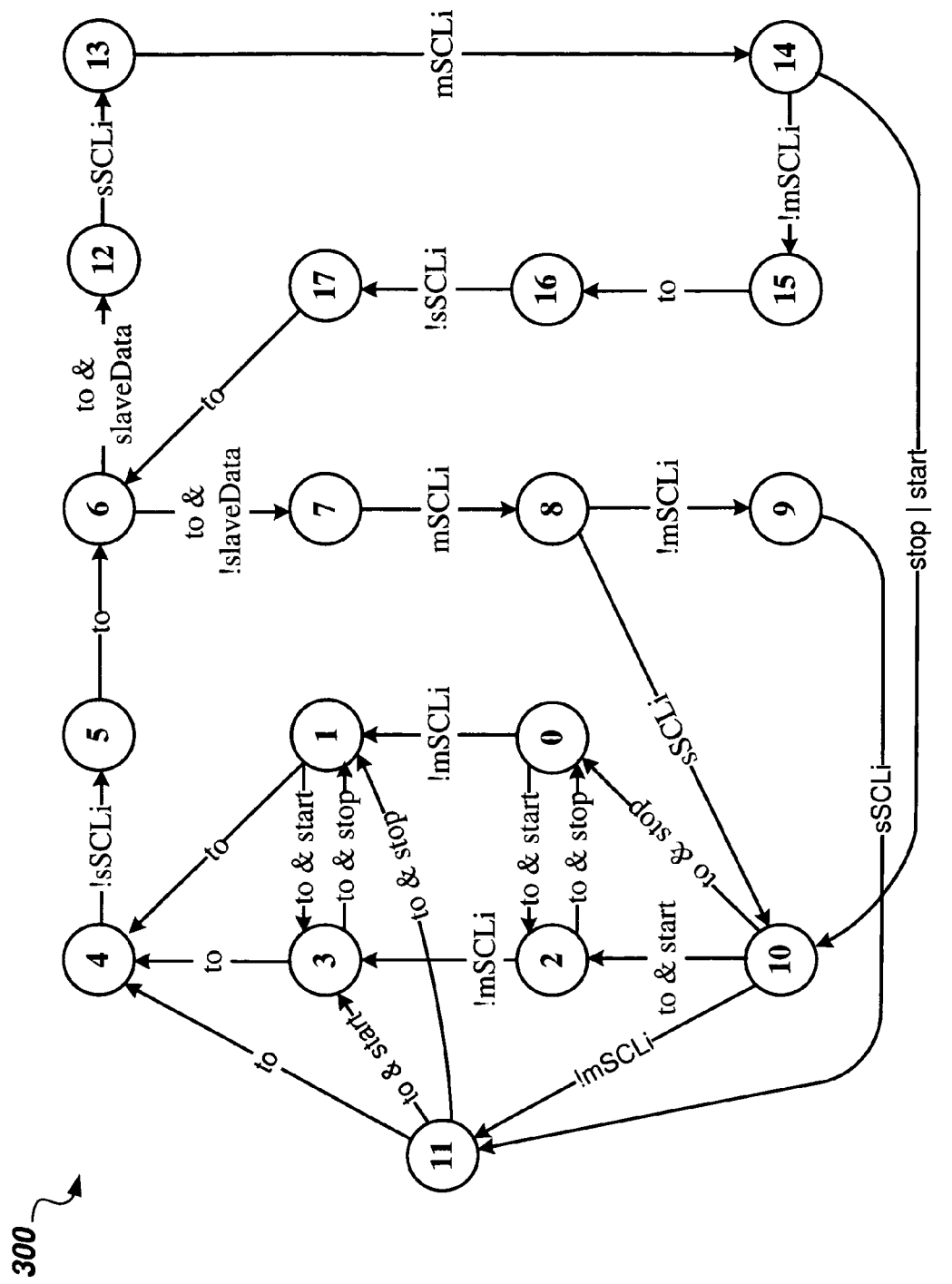
FIG. 6 is a state diagram 300 of the State Machine 216 of the digital I²C-bus repeater 200.

FIG. 6 is a state diagram 300 of the State Machine 216 of the digital I²C-bus repeater 200 of FIG. 4. The state which may conveniently be read in conjunction with a tabulation of the states shown in Table 3 below. The State Machine 216 includes N=18 distinct states, numbered 0 to 17. The State Machine is always in one of the N states, and each state is followed by one or more successor states which are reached by one or more trigger conditions. For each state, values of the five output signals of the state machine (mSCLo, sSCLo, mDctl, sDctl, and the timer value "tv") are defined in Table 3. When in any particular state, the state machine monitors the six input signals of the state machine (start, stop, mSCLi, sSCLi, slaveData, and time-out "to"). A transition from one state to another occurs when one or more of the input signals exhibit specified values (triggers). The state diagram 300 shows circles numbered 0 to 17, each circle representing a state numbered correspondingly in Table 3. The circles are joined by directional lines labeled with trigger labels based on the signal names of the triggers. In these trigger labels, common logic symbols are used, "&" denoting logical AND, "!" denoting negation i.e. logical NOT, and "l" denoting logical OR. By way of explanation for example, a "to & !slaveData" label from state #6 to state #7 means that the time-out and the slaveData input are monitored when the state machine is in the state #6. The state will change from #6 to the state #7 when simultaneously the time-out occurs AND slaveData is NOT asserted; the state will change from #6 to the state #12 when simultaneously the time-out occurs AND slaveData is asserted.

Table 3 lists the states of the State Machine 216. The first column contains the state number and the second column lists a corresponding mnemonic state name. The next five columns list the values of the five output signals that are generated by the state machine in each of its states: mSCLo, sSCLo, mDctl, sDctl, Timer value ("tv"). The last column lists the one or more successor states by number, of each of the states listed in the first column.

Figure 7:
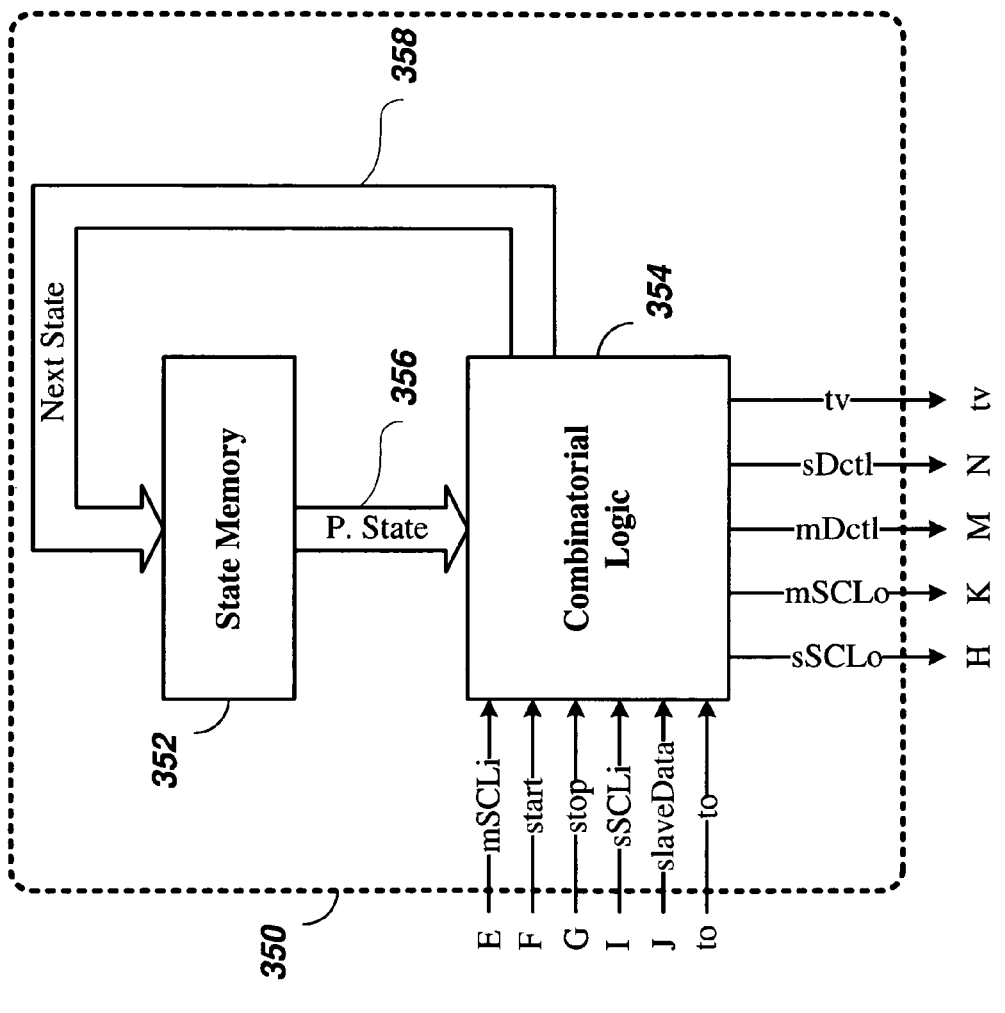
FIG. 7 shows a block diagram of a conventional synchronous implementation 350 of the State Machine 216.

FIG. 7 shows a block diagram of a conventional synchronous implementation 350 of the State Machine 216 including a State Memory 352 and a Combinatorial Logic 354. The State Memory 352 outputs a Present State 356 to the Combinatorial Logic 354. The Combinatorial Logic 354 receives the Present State 356 and the six input signals of the State Machine 216 (start, stop, mSCLi, sSCLi, slaveData, and time-out "to"), and outputs the five output signals of the State Machine 216 (mSCLo, sSCLo, mDctl, sDctl, and the timer value "tv"). The Combinatorial Logic 354 also outputs a Next State 358 to the State Memory 350 to be stored there. When a trigger event occurs (see FIG. 6) the Next State 358 momentarily differs from the Present State 356 and is latched into the State Memory 352 to become the new Present State 356, following the rules embedded in the Combinatorial Logic 354 and described in FIG. 6 above.

Repeater Functionality

The functionality of the digital I²C-bus repeater 200 is further explained with the aid of two timing diagrams.

Figure 8:
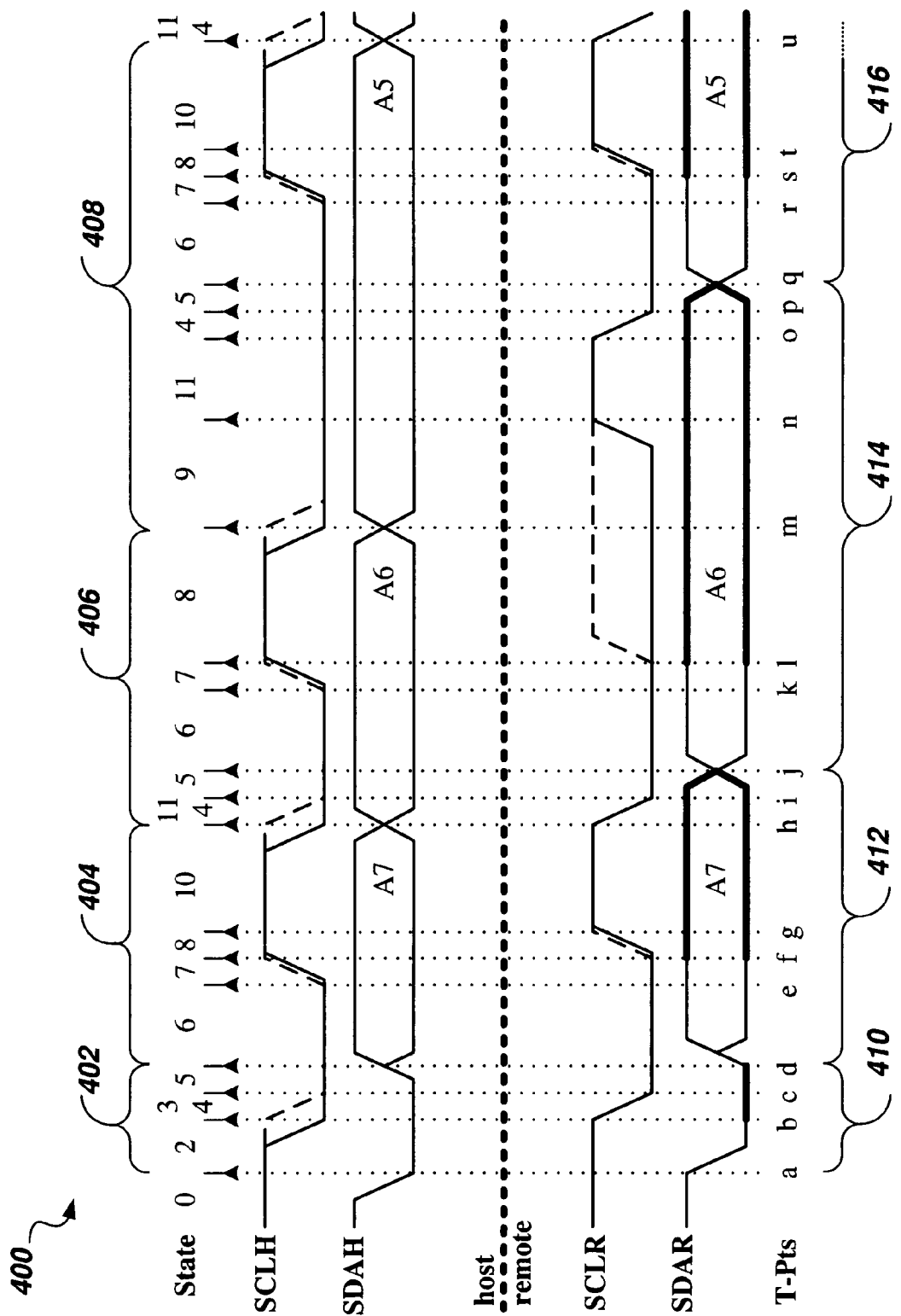
FIG. 8 shows a diagram of an example start-of-transmission sequence 400 of the digital I²C-bus repeater 200.

FIG. 8 shows a diagram of an example start-of-transmission sequence 400 of the digital I²C-bus repeater 200 of FIG. 4, illustrating the repeater function with signal wave forms at the start of an address transmission from the master to the slave. Illustrated in the start-of-transmission sequence 400 are wave forms of the host side bus signals (see host side I²C-bus 222, see FIG. 4) SCLH and SDAH, and corresponding wave forms of the remote side bus signals (see remote side I²C-bus 224) SCLR and SDAR.

This figure illustrates a typical example of address transmission from the master on the host side I²C-bus 222 to the slave on the remote side I²C-bus 224 through the digital

TABLE 3

List of states of the State Machine 216

| State | State Name | mSCLo | sSCLo | mDctl | sDctl | Timer value | Successor states |
|---|---|---|---|---|---|---|---|
| 0 | STOP | 1 | 1 | PASS | 1 | LO | 1, 2 |
| 1 | STR_STOP | 0 | 1 | PASS | 1 | LO | 3, 4 |
| 2 | START | 1 | 1 | PASS | 0 | HI | 0, 3 |
| 3 | STR_START | 0 | 1 | PASS | 0 | HI | 1, 4 |
| 4 | W_WAIT_SLA_LO | 0 | 0 | PASS | HOLD | OFF | 5 |
| 5 | W_HOLD_CNT | 0 | 0 | PASS | HOLD | HOLD | 6 |
| 6 | LO_CNT | 0 | 0 | PASS | PASS | LO | 7, 12 |
| 7 | W_WAIT_MAS | 1 | 0 | PASS | PASS | OFF | 8 |
| 8 | W_WAIT_SLA | 1 | 1 | PASS | HOLD | OFF | 9, 10 |
| 9 | W_STR_MAS | 0 | 1 | PASS | HOLD | OFF | 11 |
| 10 | W_HI_CNT | 1 | 1 | PASS | HOLD | HI | 2, 11 |
| 11 | W_STR_HI_CNT | 0 | 1 | PASS | HOLD | HI | 1, 3, 4 |
| 12 | R_WAIT_SLA_HI | 0 | 1 | PASS | PASS | OFF | 13 |
| 13 | R_WAIT_MAS_HI | 1 | 1 | HOLD | PASS | HI | 14 |
| 14 | R_WAIT_MAS_LO | 1 | 1 | HOLD | PASS | HI | 15 |
| 15 | R_WAIT_SLA_TIME | 0 | 1 | HOLD | PASS | HI | 16 |
| 16 | R_WAIT_SLA_LO | 0 | 0 | HOLD | PASS | OFF | 17 |
| 17 | R_HOLD_CNT | 0 | 0 | HOLD | PASS | HOLD | 6 |

I²C-bus repeater 200. The signals SCLH and SDAH are generated by the master, and regenerated by the repeater as the signals SCLR and SDAR.

The start-of-transmission sequence 400 comprises the transmission of clock and data sequences from the master on the host side to the repeater on SCLH and SDAH, including a START sequence, followed by address bit transmissions A7, A6, and A5, in corresponding state sequence sections 402, 404, 406, and 408. The start-of-transmission sequence 400 comprises further the transmission of clock and data sequences from the repeater to the slave on the remote side on SCLH and SDAH, repeating the START and the address bit transmissions A7, A6, and A5, but delayed in corresponding state sequence sections 410, 412, 414, and 416.

The state sequence section 402 on the host side comprises the states #2, #3, #4, and #5 of the State Machine 216. Similarly the state sequence section 404 comprises the states #6, #7, #8, and #10; the state sequence section 406 comprises the states #11, #4, #5, #6, #7, and #8; and the state sequence section 408 comprises the states #9, #11, #4, #5, #6, #7, and #8, and #10.

The state sequence section 410 on the remote side comprises the states #2, #3, #4, and #5 of the State Machine 216. Similarly the state sequence section 412 comprises the states #6, #7, #8, #10, #11, #4, and #5; the state sequence section 414 comprises the states #6, #7, #8, #9, #11, #4, #5; and the state sequence section 416 comprises the states, #6, #7, and #8, #10, and #5 (#5 not shown).

The START sequence is sent by the master as a HI-LO transition on SDAH while SCLH is HI (the state sequence section 402), and repeated on the slave-side as a HI-LO transition on SDAR while SCLR is HI (the state sequence section 410). This is followed by the transmission of some address bits A7, A6, A5 . . . . The first bit (A7) is not stretched by the slave and thus the repeater follows with minimal delay. The second bit (A6) does get stretched by the slave in this example however. This is indicated by a dashed high on SCLR as the repeater releases the clock line SCLR, but the slave holds SCLR low. The repeater responds by holding the master clock SCLH low in the following bit-period while maintaining the hold of the value A6 on the slave data-line SDAR. This shows how the repeater effectively transfers a stretched delay on the slave side to a delay on the following bit on the master-side. Note that throughout any transmission the repeater preserves correct I²C timing by making use of the timer 214 regardless whether the master is compliant.

The regeneration incurs some circuit delay, but more importantly some signals are stretched or held, as a result of the action of the State Machine 216. At the top of the diagram, a time line labeled "State" indicates the state numbers that correspond to the bus signals. In effect, every change in the bus signals is reflected by a change in the state of the State Machine 216. As described above, the State Machine 216 monitors the clock signals mSCLi (from SCLH, see FIG. 4) and sSCLi (from SCLR), the start and stop flags, the Timer 214, and the slaveData flag from the Protocol Sequencer 218.

Solid lines in the wave forms indicate the signal on the respective bus signal lines (SCLH, SDAH, etc.), while dashed lines on the clock signal traces (SCLH and SCLR) indicate the internal signals mSCLo and sSCLo which may be HI while the corresponding bus line is driven LO by the respective device (master or slave).

Heavy solid lines indicate periods during which the State Machine holds a data line (SDAH or SDAR) having latched the previous HI or LO value.

At the bottom of the start-of-transmission sequence 400, a transition sequence is labeled, that is major transitions points are labeled "a", "b", . . . to "u".

At the beginning of the start-of-transmission sequence 400, the State Machine's is in the state #0. Then, following the sequence shown in FIG. 8, the State Machine 216 goes from state to state, driven by changes in its inputs indicated by the transition point labels as follows:

(a) The START condition is generated by the master (HI/LO transition on SDAH while the SCLH is HI); it is detected by the START/STOP Detector 212, resulting in the start flag being asserted and assuming the timer has expired (trigger "to & start", see FIG. 6), the State Machine goes to the state #2. In the state #2, SDAR is forced LO (sDctl=0).

(b) After SCLH is driven LO by the master (trigger "!mSCLi"), the State Machine goes to the state #3. In the state #3 the master clock line SCLH is driven LO by the state machine (mSCLo=0) for a specified time. After the time out (trigger "to"), the State Machine goes to the state #4. In the state #4 the machine waits for SCLR to go LO (after the slave has reacted to the START) while holding SDAR to its previous value (=LO); both SCLH and SCLR are driven low (from mSCLo and sSCLo).

(c) When SCLR is seen to go LO (trigger "!sSCLi"), the State Machine goes to the state #5. The state #5 is merely a timing state.

(d) After the time out (trigger "to"), the State Machine goes to the state #6; In the state #6, the HOLD on SDAR is released, leaving the Data-line Controller 220 (FIG. 4) to PASS the data bit A7 from the host side bus (SDAH) to the remote side bus (SDAR);

(e) After another time out, and in the absence of any indication that a bus turn-around is needed (trigger "to & !slaveData"), the State Machine goes to the state #7. In the state #7, the system waits for the master clock (SCLH=mSCLi) to go HI.

(f) When this occurs (trigger "mSCLi"), the State Machine goes to the state #8; in the state #8, the system allows the slave clock line SCLR to go HI. Also in the state #8, the data value on SDAR is held to its previous value (heavy solid line in the diagram).

(g) After seeing the slave clock line SCLR go HI, (trigger "sSCLi"), the State Machine goes to the state #10; in the state #10, the data value on SDAR continues to be held to its previous value (heavy solid line in the diagram) while the slave reads the data bit A7 on the remote side bus (SDAR).

(h) When SCLH goes LO (trigger "!mSCLi"), the State Machine goes to the state #11. The state #11 provides for the possibility that the master sends a (re-)START or aSTOP instead of sending the next data bit as in the start-of-transmission sequence 400 here.

(i) After the time out (trigger "to"), the State Machine goes to the state #4 and the transfer of another data bit can begin as before. In the state #4 again, the machine waits for SCLR to go LO (after the slave has received the data bit A7) while holding SDAR to its previous value (=LO); both SCLH and SCLR are driven low (from mSCLo and sSCLo).

(j), (k), and (l) repeat the transition points (c), (d), and (e), but for the next data bit A6.

Having reached the state #8 after the transition (1), the system allows the slave clock line SCLR to go HI (dashed line indicating sSCLo=1), but the slave is holding the line LO (solid line) to effect clock-stretching as described above (FIG. 3). In the state #8, the data value on SDAR is held to its previous value (heavy solid line in the diagram) by the repeater. In the example depicted in FIG. 8, the previous bit (A6) is held on the remote side bus until the slave has clocked it in. The state #8 continues until either the slave side clock line goes I-II (after the slave has finished "stretching" the clock), or the master side clock goes LO (because the master is sending another data bit). The latter was seen at the transition point (g) above.

(m) After seeing the master clock line SCLH go LO, (trigger "!mSCLi"), the State Machine goes to the state #9; in the state #9, the data value on SDAR continues to be held to its previous value (heavy solid line in the diagram) while the slave stretches the clock.

(n) When the slave finally releases the clock and SCLR goes HI, (trigger "mSCLi"), the State Machine goes to the state #11. In the state #11, the data value on SDAR continues to be held to its previous value (heavy solid line in the diagram) during which the slave is presumed to finally read the data bit (A6). The duration of the state #11 after the transition (n) continues until the minimum "HOLD" time (see Table 2) expires.

(o) After the time out, the State Machine goes to the state #4 as before. The remaining transition points (p), (q), (r), (s), (t), and (u) are similar to the previous transition points (c), (d), (e), (f), (g), and (h).

A second example sequence shown in FIG. 9 below shows the bus being "turned-around" for an ACK from the slave, followed by a data read sequence in which the slave sends data bits to the host. The end of the address transmission is shown with the read/write (R/W) bit indicating a subsequent data read sequence. At this point the slave must respond by sending an ACK if it wishes to transmit the following byte. This reverses the order of operation of the repeater. Now the slave must be allowed to clock the SCL line and reveal its data bit value before the master data-line can be assigned a value. The operation is practically the reverse case to the transmission of address or write bits from the master to the slave shown above in FIG. 8.

Figure 9:
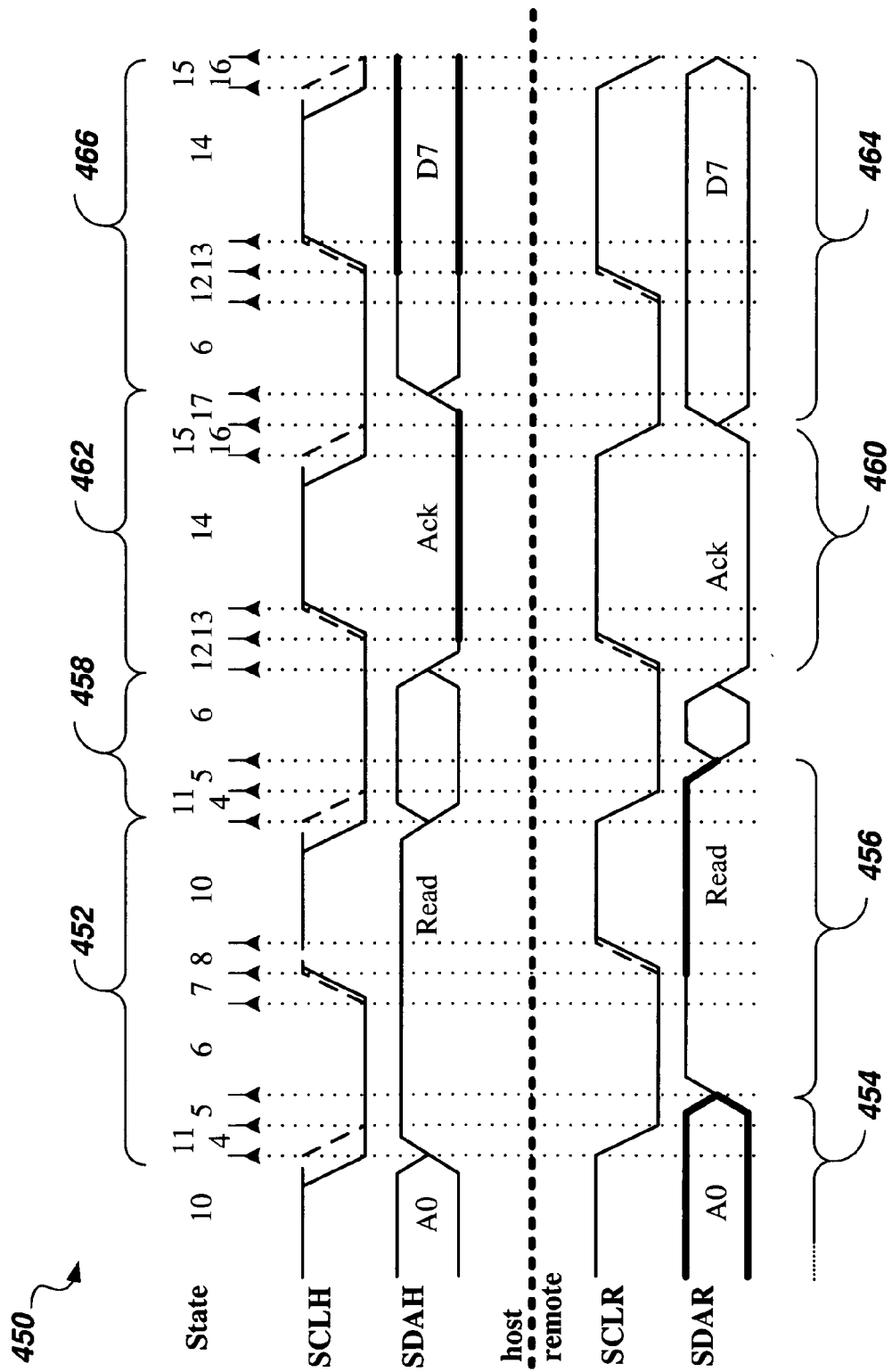
FIG. 9 shows a diagram of an example middle sequence 450 of the digital I²C-bus repeater 200.

FIG. 9 shows a diagram of an example middle sequence 450 of the digital I²C-bus repeater 200, illustrating signal wave forms at the end of an address transmission from the master to the slave, the acknowledgment from the slave, and the first data bit transmitted from the slave to the master. Illustrated in the middle sequence 450 are wave forms of the host side bus signals (see host side I²C-bus 222, see FIG. 4) SCLH and SDAH, and corresponding wave forms of the remote side bus signals (see remote side I²C-bus 224) SCLR and SDAR.

The diagram of the middle sequence 450 follows the same style as the diagram of the start-of-transmission sequence 400. At the top of the diagram, a time line labeled "State" indicates the state of the State Machine 216 that correspond to the bus signals. In effect, every change in the bus signals is reflected by a change in the state of the State Machine 216.

Solid lines in the wave forms indicate the signal on the respective bus signal lines (SCLH, SDAH, etc.), while dashed lines on the clock signal traces (SCLH and SCLR) indicate the internal signals mSCLo and sSCLo of the repeater which may be HI while the corresponding bus line is driven LO by the respective device (master or slave).

Heavy solid lines indicate periods during which the State Machine 216 holds a data line (SDAH or SDAR) having latched the previous HI or LO value.

The middle sequence 450 comprises the transmission of clock and data sequences from the master on the host side to the repeater on SCLH and SDAH, including the last address bit A0, and a "read" bit in a state sequence section 452 on the host side. The last address bit A0 and the "read" bit appear regenerated on the remote side during state sequence sections 454 and 456. In a state sequence section 458 which begins following the state sequence section 452 on the host side, the digital I²C-bus repeater 200 is evaluating the R/W bit (set to "read" here) in its Protocol Sequencer 218. In the present example, the "read" bit results in a slaveData flag. But in any case, the timing of the R/W bit following the last address bit A0 indicates that the slave is expected to be starting a transmission, as the slave must now transmit an acknowledge (ACK) to the master which requires the bus to be turned around. The ACK is received in a state sequence section 460 on the remote side, and retransmitted on the host side in a state sequence section 462. A first data bit D7 is then similarly received by the repeater from the remote side in a state sequence section 464, and retransmitted on the host side in a state sequence section 466.

The host side state sequence section 452 comprises the states #11, #4, #5, #6, #7, #8, and #10 of the State Machine 216. Similarly the host side state sequence sections 458, 462, and 466 comprise the states (#11, #4, #5, #6), (#12, #13, #14, #15, #16, #17), and (#6, #12, #13, #14, #15, #16, . . . ) respectively.

The remote side state sequence section 454 comprises the states #6, #7, #8, #10, #11, #4, and #5 of the State Machine 216 of which only the last four are visible in the diagram. Similarly the host side state sequence sections 456, 460, and 464 comprise the states (#6, #7, #8, #10, #11, #4, #5), (#12, #13, #14, #15, #16), and (#17, #6, #12, #13, #14, #15, #8) respectively.

Figure 10:
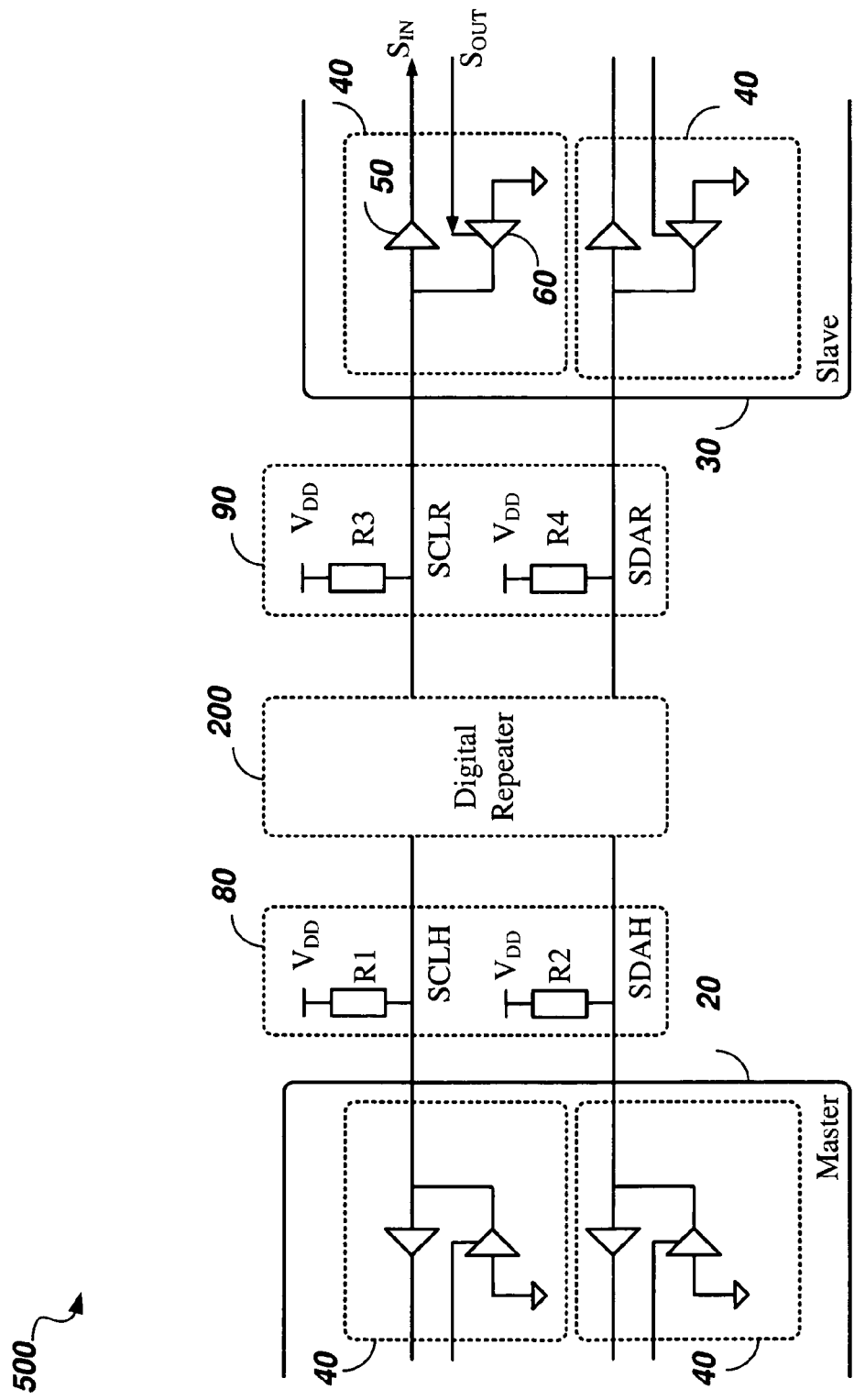
FIG. 10 illustrates an improved repeatered I²C-bus system 500 including the digital I²C repeater 200 of FIG. 4.

The state sequence sections of FIGS. 9 and 10 may be followed in the state diagram 300 of FIG. 6, where the sequences that include the state #8 form a loop that results in forwarding a bit from the host side to the remote side, and the sequences that include the state #14 form a loop that results in forwarding a bit from the remote side to the host side. The state #6 (e.g. between the state sequence sections 456 and 460 in FIG. 9) is a nodal state where the two loops split off from one another depending on the value of the slaveData flag.

A transition by transition walk-through of the middle sequence 450 is omitted as it may be readily understood from the example given for FIG. 8, and by consulting the State Machine table (Table 3) in conjunction with the state diagram 300.

The functionality of the digital I²C-bus repeater 200 relies on bit-level clock-stretching which is a feature of the I²C specification, as well as of other Wired-AND buses. As described above, clock-stretching allows connected devices to hold the clock line low in order to satisfy possible frequency limitations during arbitration, see FIG. 3.

For a given bit transfer from a master to a slave through the repeater, it is not known what the slave response will be and this response can not faithfully be transferred to the master through the repeater. The response can, however, be deferred to the following bit-period using the clock-stretching function described above, provided the repeater is aware of which side is transferring the current data bit. Information about which side is providing data can be derived from the I²C specification, which details the location of ACK bits and the protocol for requesting reads or writes of data from a slave.

In the case where the master is providing data, the digital I²C-bus repeater 200 allows the master to send its clock pulse, while mirroring this pulse on the slave side. The data from the master is also transferred to the slave data and held until the slave pulse has completed. When the master pulse has pulled its clock low for the following bit, the repeater holds the clock in this state, effectively deferring transmission. The slave may stretch the assertion of the pulse for an arbitrary period, but as long as the master sees its clock being held low, it can not commence transmission of the following bit. Effectively, any stretch by the slave prior to the clock pulse is transferred to the master after the associated pulse.

The case for data originating from the slave is practically the reverse. The repeater holds the master clock-line low and generates a pulse on the slave. Only when the slave has asserted is the master allowed to assert, as the data to be transferred to the master only becomes valid on the rising edge of the slave clock. A difference compared to a pure analog repeater is that in digital I²C-bus repeater 200 the signaling is actually generated in the repeater and not simply transferred from the master bus.

Apart from control and monitoring of these bit-level transactions by the state machine, byte-level operations are monitored in the Protocol Sequencer 218 of the digital I²C-bus repeater 200 to discern the data source. Another feature, which has to be represented, is the transmission of START/STOP sequences specific to the I²C-bus. These are protocol signals, which indicate initiation or cessation of a transmission respectively. Both happen when the clock-line (SCL) is high. This means they can not be finely controlled by clock-stretching. A master could, for example, send a STOP (data line goes high while clock is high) followed by a START (data line goes low while clock is high) without the repeater being able to defer either operation. In a worst-case-scenario, the slave could be still stretching the clock associated with the previous bit transmission while the START/STOP or STOP/START sequence is being transmitted from the master. The repeater has to have independent logic to log the reception and sequence of these conditions so that they may be transferred to the slave at the next opportunity. This is accomplished with the State Machine 216 in a group of states that include the states #0, #1, #2, #3, and #10.

The sequence of events that have been described in detail in FIG. 8 is briefly described as a number of steps:

1. The master on the host side bus sends an I²C START sequence by pulling SCLH low while SDAH is low;

2. The repeater responds by copying the start sequence on SCLR, SDAR on the remote side bus;

3. The repeater releases SCLR and copies the first data value from SDAH to SDAR;

4. The host is allowed to cycle SCLH transmitting the first bit to the repeater;

5. As SCLH transitions low the repeater holds SCLH low to stretch the master clock while latching the value on SDAR until the slave is ready to pick it up;

6. When the slave finishes stretching the clock if necessary (SCLR goes high) the repeater times the clock high phase and pulls SCLR low to transmit the first bit to the slave;

7. At this point SCLH is released so the master can commence transmission of another bit, the value on SDAR is released and assumes the new value from SDAH.

This sequence of steps is repeated from the step 4. for each transmitted bit.

This method allows any clock stretching by the slave on the remote side to be deferred to the next low phase on the master side of the repeater.

Given that the I²C is a bidirectional protocol, the case where the slave needs to transfer a bit to the master has to be also considered, i.e. the repeated-side data is transferred to the host-side. This situation first arises when the slave wishes to send an I²C ACK signal to indicate an address match or reception of a byte. In this case it is not valid for SCLR to follow SCLH as assertion of the master clock would indicate that the ACK is valid—but if the slave clock has not yet asserted the value on the slave data line, the ACK is not yet valid. Also the direction of transfer of data must be reversed to SDAR→SDAH. The steps for transferring the ACK are as follows:

8. The number of bits transferred to the slave are counted in the Protocol Sequencer 218 of the of the digital I²C-bus repeater 200;

9. When the count reaches 8, the repeater continues to hold SCLH low preventing the master from latching the following ACK;

10. SDAR is released so that the slave can drive it and the repeater can transfer this value to SDAH;

11. SCLR is asserted allowing the slave to indicate its ACK level;

12. After SCLR is asserted by the slave, SCLH is asserted by the repeater to transfer the now valid ACK value;

13. The SCL pulses are completed on both host and repeater sides.

In the case of a write operation, instead of a read operation, the bus must be reversed again after the ACK to allow the master to commence sending another byte. This proceeds just as before with SCLR following SCLH.

In the second sequence in the diagram (FIG. 9), the end of an address byte followed by ACK and the start of a read operation is shown. In order to respond to a read operation, the repeater must know when it is going to happen. This is discovered by registering the R/W bit of the address; when this bit is high and the address is acknowledged by the slave, the repeater continues the reversed sequence following the ACK. From the point of view of the design, the bits forwarded to the master in a read operation are treated identically to ACKs.

FIG. 10 illustrates an improved repeatered I²C-bus system 500 of the embodiment of the invention, including the digital I²C repeater 200 of FIG. 4 connected between the master device 20 and the slave device 30. The improved repeatered I²C-bus system 500 is similar in structure to the prior art repeatered I²C-bus system 61 of FIG. 2, except that the prior art I²C repeater 70 has been replaced with the digital I²C repeater 200 of the embodiment of the present invention.

While an embodiment of the digital I²C repeater 200 has been described in terms of digital hardware, it is obvious to qualified persons that a digital I²C repeater having the same functionality may also be implemented by a program controlled micro processor or micro-controller. Such an implementation is also intended to be within the scope of the claims that follow.

Thus, a digital repeater implementation according to the embodiment of the invention has been provided that relies on purely digital techniques, avoids challenging analog designs, and may be realized in any of many available digital circuit technologies allowing the circuit design to be documented in RTL for ease of simulation and transfer into manufacturing.

Although the embodiment of the invention has been described in detail, it will be apparent to one skilled in the art that variations and modifications to the embodiment may be made within the scope of the following claims. n clock-stretching occurs or when the bus is turned around.

What is claimed is:

1. A digital repeater for repeating bidirectional signals between a host side wired-AND bus connected to a master device, the host side wired-AND bus comprising a host side serial clock line (SCLH) and a host side serial data line (SDAH), and a remote side wired-AND bus connected to a slave device, the remote side wired-AND bus comprising a remote side serial clock line (SCLR) and a remote side serial data line (SDAR), the digital repeater comprising:
   an internal repeater logic circuitry;
   two host side serial line interface cells for interfacing between the internal repeater logic circuitry and the host side serial clock and data lines;
   two remote side serial line interface cells for interfacing between the internal repeater logic circuitry and the remote side serial clock and data lines;
   a START/STOP detector for receiving signals from the host side serial clock and data lines and determining start and stop flags indicating START and STOP conditions respectively on the wired-AND bus;
   a protocol sequencer for receiving signals from the remote side serial clock and data lines, determining whether the master device on the host side wired-AND bus or the slave device on the remote side wired-AND bus is transmitting, and asserting a "slaveData" flag to indicate that the slave device is transmitting; and
   a state machine for receiving clock signals arriving on the host and remote side serial clock lines, receiving the start, stop, and "slaveData" flags, and sending clock signals on the host and remote side serial clock lines and determining whether to pass, hold, or force serial data signals on the host and remote side serial data lines, wherein to pass is to pass a signal through the repeater, to hold is to hold a signal at a previous value, and to force is to set a signal on one side of the repeater to a logical zero LO or a logical one HI regardless of the signal on the other side of the repeater.

2. The digital repeater of claim 1, further including a data-line controller for passing, holding or forcing the serial data signals under control of the state machine.

3. The digital repeater of claim 2, wherein the data-line controller includes:
   a transparent host side latch for passing or holding the SDAH under control of the state machine;
   a transparent remote side latch for passing or holding the SDAR under control of the state machine;
   a switch allowing the SDAR to float under control of the state machine; and
   a Field Effect Transistor (FET) for grounding the SDAR under control of the state machine.

4. The digital repeater of claim 1, wherein the state machine is always in one of a plurality of N states, and each successor state is reached by a trigger condition derived from signals received by the state machine.

5. The digital repeater of claim 4, wherein N=18.

6. The digital repeater of claim 4, wherein the N states of the state machine include:
   at least one state having a plurality of successor states, a first one of which is triggered when the "slaveData" flag is logical "0" and a second one of which is triggered when the "slaveData" flag is logical "1".

7. The digital repeater of claim 4, wherein the N states of the state machine include:
   at least one state having a plurality of successor states, a first one of which is triggered when the start flag is determined and a second one of which is triggered when the stop flag is determined.

8. The digital repeater of claim 4, wherein the state machine is associated with a timer and includes at least one state for which the trigger is a time out of the timer.

9. A method for repeating bidirectional signals between a host side wired-AND bus connected to a master device, the host side wired-AND bus comprising a host side serial clock line (SCLH) and a host side serial data line (SDAH), and a remote side wired-AND bus connected to a slave device, the remote side wired-AND bus comprising a remote side serial clock line (SCLR) and a remote side serial data line (SDAR), the method comprising:
   receiving each of the bidirectional signals of the host side and remote side wired-AND buses;
   extracting in serial line interface cells unidirectional clock and data receive signals from the bidirectional signals of the serial clock and data lines;
   processing the unidirectional clock and data receive signals to generate unidirectional clock and data transmit signals;
   outputting the unidirectional clock and data transmit signals on the host side and remote side wired-AND buses through the serial line interface cells;
   determining start and stop flags from the unidirectional clock and data receive signals; and
   determining from the unidirectional clock and data receive signals whether a master device on the host side wired-AND bus or a slave device on the remote side wired-AND bus is transmitting, and asserting a "slaveData" flag to indicate that the slave device is transmitting;
   the step of processing including:
      triggering a state machine with the unidirectional clock receive signals, and the start, stop, and "slaveData" flags; and
      outputting from the state machine the unidirectional clock transmit signals, according to a state reached in the state machine.

10. The method of claim 9, further including:
   outputting one or more control signals from the state machine according to the state reached in the state machine and generating the unidirectional data transmit signals according to the control sigma by passing the unidirectional data receive signals through, holding the unidirectional data transmit signals at their previous value, or forcing them, wherein to force is to set to a logical zero LO or a logical one HI regardless of the value of the unidirectional data receive signals.

11. The method of claim 10, wherein the outputting control signals includes:
   outputting a master data control signal,
      one value of which to cause the value of SDAR to pass to SDAH, another value to cause the previous value of SDAH to be held.

12. The method of claim 11, wherein the outputting control signals comprises:
   outputting a slave data control signal,
      one value of which to cause the value of SDAH to pass to SDAR,
      a second value of which to cause the previous value of SDAR to be held,
      a third value of which to cause SDAR to float HI, and
      a fourth value of which to set SDAR to LO.

13. The method of claim 9, wherein the triggering includes triggering the state machine from one of a plurality of N states, into a successor state that is a distinct other of the plurality of N states.

14. The method of claim 13, wherein N=18.

15. The method of claim 13, wherein the triggering includes triggering at least one state having a plurality of successor states, a first one of which is triggered when the "slaveData" flag is logical "0" and a second one of which is triggered when the "slaveData" flag is logical "1".

16. The method of claim 13, wherein the triggering includes triggering at least one, state having a plurality of successor states, a first one of which is triggered when the start flag is determined and a second one of which is triggered when the stop flag is determined.

17. The method of claim 13, wherein the triggering includes triggering with a timer.

18. The digital repeater of claim 1, wherein the wired-AND bus is an I²C bus.

19. The method of claim 9, wherein the wired-AND bus is an I²C bus.

20. A communication system, comprising:
a master device connected to a host side wired-AND bus, and a slave device connected to a remote side wired-AND bus, wherein the host side wired-AND bus is joined to the remote side wired-AND bus by a digital repeater to provide a communication path between the master device and the slave device;

wherein said digital repeater is provided for repeating bidirectional signals between the host side wired-AND bus connected to the master device, the host side wired-AND bus comprising a host side serial clock line (SCLH) and a host side serial data line (SDAH), and the remote side wired-AND bus connected to the slave device, the remote side wired-AND bus comprising a remote side serial clock line (SCLR) and a remote side serial data line (SDAR), the digital repeater comprising:

an internal repeater logic circuitry;

two host side serial line interface cells for interfacing between the internal repeater logic circuitry and the host side serial clock and data lines;

two remote side serial line interface cells for interfacing between the internal repeater logic circuitry and the remote side serial clock and data lines;

a START/STOP detector for receiving signals from the host side serial clock and data lines and determining start and stop flags indicating START and STOP conditions respectively on the wired-AND bus;

a protocol sequencer for receiving signals from the remote side serial clock and data lines, determining whether the master device on the host side wired-AND bus or the slave device on the remote side wired-AND bus is transmitting, and asserting a "slaveData" flag to indicate that the slave device is transmitting; and a state machine for receiving clock signals arriving on the host and remote side serial clock lines, receiving the start, stop, and "slaveData" flags, and sending clock signals on the host and remote side serial clock lines and determining whether to pass, hold, or force serial data signals on the host and remote side serial data lines, wherein to pass is to pass a signal through the repeater, to hold is to hold a signal at a previous value, and to force is to set a signal on one side of the repeater to a logical zero LO or a logical one HI regardless of the signal on the other side of the repeater.

* * * * *